Nov. 9, 1965 R. G. GIRARD 3,216,395
METHOD AND APPARATUS FOR PREVENTING CANNIBALISM IN
THE REARING OF TROPICAL FISH
Filed June 19, 1964

INVENTOR.
RAYMOND G. GIRARD
BY
Barlow & Barlow
ATTORNEYS

United States Patent Office 3,216,395
Patented Nov. 9, 1965

3,216,395
METHOD AND APPARATUS FOR PREVENTING CANNIBALISM IN THE REARING OF TROPICAL FISH
Raymond G. Girard, 224 Ashley Blvd., New Bedford, Mass.
Filed June 19, 1964, Ser. No. 376,455
8 Claims. (Cl. 119—5)

This invention relates to the rearing of tropical fish, more particularly the species in which the young are born alive.

One of the most interesting of the species of the tropical fish, especially to the novice, are those that have the young born alive. It is known, however, that in many cases the young are unable to escape from the mother and the mother eats the young; and therefore, the full production of the babies that are born alive are lost. Various devices have been provided for assisting the young to escape but many times the young do not take advantage of aids which are provided.

One of the objects of this invention is to provide an apparatus which by reason of the action of the water will forcibly remove the young after birth from the mother through an opening through which the mother cannot pass; thus by such removal quickly and effectively preventing the mother from eating the young.

A more specific object of this invention is to provide a confining area for the mother with an opening from this area through which the young may pass but through which the mother cannot pass and to then forcibly circulate water through the opening so that as soon as the young are born alive from the mother, they will pass through the opening into an area where the mother cannot follow.

Another object of this invention is to circulate the water through the passage away from the mother and through which the mother cannot pass with sufficient force so that the young cannot swim against the current.

Another object of this invention is to provide a simple means by which the above objects may be accomplished.

A further object of the invention is to provide an air injector type of circulation of the water which is a form of water circulation which is readily obtainable on the market.

With these and other objects in view, the invention consist of certain novel features of construction as will be more fully described and particularly pointed out in the appended claims.

Figure 1:
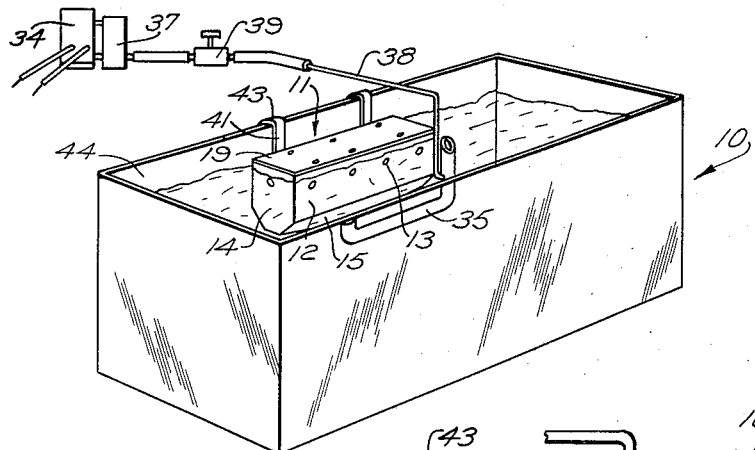
Figure 2:
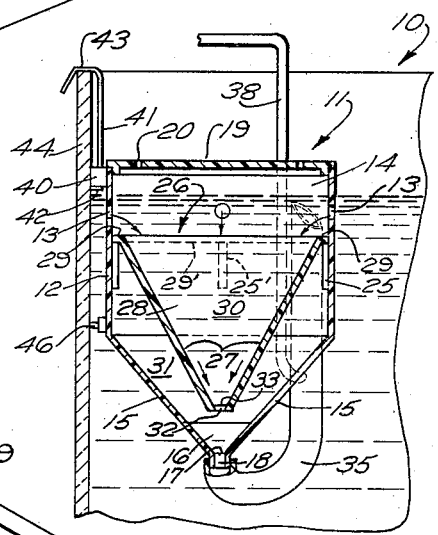
Figure 3:
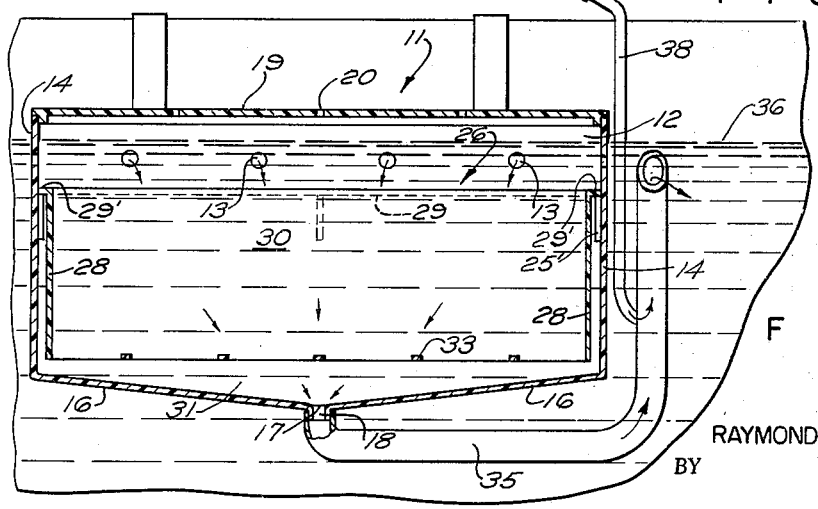

In the accompanying drawings:

FIG. 1 is a perspective view of an aquarium showing my apparatus suspended therein; and FIGS. 2 and 3 are sectional views taken at substantially right angles to each other through the aquarium and through my apparatus in the aquarium.

In proceeding with this invention, I provide a compartment which is divided into two chambers or zones, one of which is to serve as a trap for the mother tropical fish and the other of which provides an area into which the babies may escape and may be carried away. The division in the compartment forming these two chambers or zones is provided with an opening which is of such a size that the mother fish cannot pass through although the baby fish can pass through. The compartment is submerged in the aquarium so that water may enter but still trap the mother in the upper chamber, while from the lower chamber, I extract water causing a circulation from the upper chamber to the lower chamber of such force that the babies or young will be carried through the opening in the division wall into the lower chamber and then out of the lower chamber and then back to the aquarium, thus separating the small baby fish from the mother so that the mother cannot eat them.

With reference to the drawing, 10 designates an aquarium for tropical fish, while 11 designates the apparatus of this invention located therein. This apparatus comprises opposite vertical side walls 12 having openings 13 at a point just above the trap and below the water level of the aquarium. There are also vertical end walls 14 while the bottom wall is made up of portions 15 which extend from the lower edges of the side walls 12 and are inclined downwardly and portions 16 which extend from the lower edges of the end walls and are also inclined downwardly, thus coming to a sort of a pyramidal juncture at 17 from which a hollow boss 18 projects for the connection of an ejection tube. A cover 19 having holes 20 therein may also be provided for the top of the apparatus.

The side walls 12 and end walls 14 are equipped with suitable abutments 25 and 25' along the opposite sides and ends to support a dividing means in the form of a trap designated generally 26 and having inclined side walls 27 in a generally V shape and vertical end walls 28 bridging the ends of the V side walls. This trap is provided with lips 29 and 29' to rest upon the abutments 25, 25' and be suspended thereby so as to provide an upper chamber 30 designed for containing the mother fish and a lower chamber 31 on the other side of the dividing wall which communicates with the upper chamber through a narrow slot 32 with spacers 33 between the lower edges of the inclined walls 27 which is a passage sufficient to permit the young or baby fish to pass through but which is a long slot of such a size that the mother fish cannot pass through.

A baby ejection tube 35 is connected to the boss 18 and extends up to a height just below the level of the water 36 in the aquarium 10. An air pump 37 driven by motor 34 supplies air through the conduit 38 into the ejection tube 35 with shut off valve 39 at a point upwardly from its lower extremity of the ejection tube so that water will be pumped through the tube in the direction of the arrows thus water will be drawn inwardly through the openings 13 which are below the level 36 of the water downwardly through the trap or chamber 30 into the chamber 31 and out through the ejection tube back into the general area of the aquarium. This circulation will be caused to be had with sufficient force so that babies which are born to the mother fish in the chamber 30 will be drawn directly quickly down through the slot 32 between the walls of the trap and out through the boss 18 of the opening 17 and through the ejection tube 35 into the aquarium which will be cleared from fish of a size to eat them and in a condition to receive the newborn baby fish, thus separating these from the mother and giving them an opportunity to live in greater quantities than as heretofore been possible, through any of the apparatus now known to exist.

In order to suspend my apparatus in the aquarium 10, I have provided bosses 40 at spaced intervals along one side wall 12 and provided suspension straps 41 slidable through these bosses and bent as at 42 to provide a lip to engage the boss on its under side while the upper lip is bent to provide a rather large hook 43 to extend over the upper edge of the side wall 44 of the aquarium so as to suspend the device in position. The length of the straps 41 will be such that the level of the water will come above the openings 13 in the side walls 12 but will be below the upper edge of the side wall 12, thus allowing a space between the cover 19 and the level of the water for circulation of air. This allows the surface of the water to gather oxygen caused by the flow of water through holes 13, FIG. 3. Struts 46 engaging the side wall 44 serve to keep the apparatus vertical.

I claim:
1. An apparatus for preventing cannibalism in the rearing of tropical fish of the species in which the young are born alive, comprising a compartment, means dividing said compartment into two zones with a passage from one to the other of a size to prevent passage of the adult mother fish but of a size to permit passage of the newborn baby fish, and suction means connected to said compartment for circulating liquid through both of said zones from one to another and out of said compartment so as to provide a current of sufficient strength to carry the newborn fish through said passage away from the mother fish in the upstream zones of said current.

2. An apparatus as in claim 1 wherein said dividing means comprise converging walls.

3. An apparatus as in claim 1 wherein said dividing means comprises converging walls and said passage is an elongated opening between the spaced edges of said converging walls.

4. An apparatus as in claim 1 wherein means are provided to hang said apparatus on the wall of an aquarium.

5. An apparatus as in claim 1 wherein said dividing means comprises a trap unit having inclined side walls and end walls and means for suspending said trap in said compartment.

6. An apparatus as in claim 1 wherein said dividing means comprises a trap unit having inclined side walls and end walls with outwardly projecting lips and said compartment has abutments on which said lips rest to suspend said trap in said compartment.

7. The method of preventing cannibalism in the rearing of tropical fish whose young are born alive which comprises placing the mother fish in a chamber having an opening therefrom of a size to pass the young but not the mother and circulating water through the chamber from the inside to the outside thereof to forcibly remove the young from the chamber in which the mother is located.

8. An apparatus for preventing cannibalism in the rearing of tropical fish of the species in which the young are born alive, comprising two liquid containing chambers with a passage from one to the other of a size to prevent passage of the adult mother fish but of a size to permit passage of the newborn baby fish, and means providing pressure differential connected to said chambers for circulating liquid through said chambers from one to another and out of said chambers so as to provide a current of sufficient strength to carry the newborn fish through said passage away from the mother fish in the upstream chamber of said current.

References Cited by the Examiner
UNITED STATES PATENTS

| | | | |
|---|---|---|---|
| 2,696,800 | 12/54 | Rork | 119—5 |
| 2,981,228 | 4/61 | Brandano | 119—2 |
| 3,095,852 | 7/63 | Goldman | 119—3 |
| 3,116,712 | 1/64 | Ogden et al. | 119—3 |
| 3,140,691 | 7/64 | Stark | 119—5 |

SAMUEL KOREN, *Primary Examiner.*

ALDRICH F. MEDBERY, *Examiner.*